F. J. CURTIS.
MACHINE TOOL.
APPLICATION FILED OCT. 16, 1916. RENEWED SEPT. 12, 1917.
1,248,276.
Patented Nov. 27, 1917.
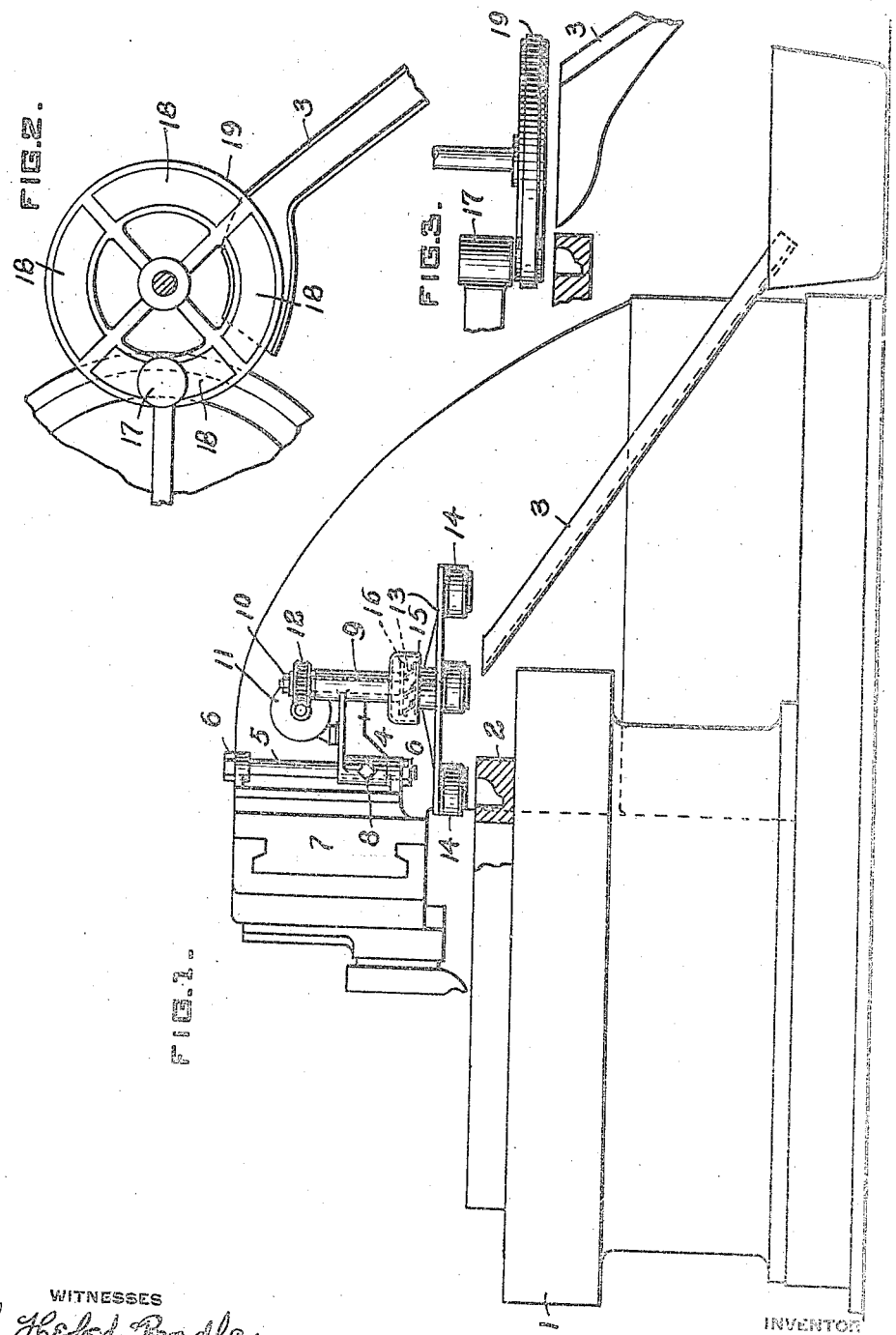

UNITED STATES PATENT OFFICE.

FRANK J. CURTIS, OF BEN AVON, PENNSYLVANIA, ASSIGNOR TO PITTSBURGH MACHINE TOOL COMPANY, OF BRADDOCK, NEW JERSEY, A CORPORATION OF NEW JERSEY.

MACHINE-TOOL.

1,248,276.  Specification of Letters Patent.  Patented Nov. 27, 1917.

Application filed October 16, 1916, Serial No. 125,890. Renewed September 12, 1917. Serial No. 191,063.

*To all whom it may concern:*

Be it known that I, FRANK J. CURTIS, residing at Ben Avon, in the county of Allegheny and State of Pennsylvania, a citizen of the United States, have invented or discovered certain new and useful Improvements in Machine-Tools, of which improvements the following is a specification.

Difficulties are encountered in removing small and fine pieces of metal formed in cutting, drilling or boring holes, grooves or recesses in metal articles, when the latter are secured in a horizontal or approximately horizontal position as on the bed of a boring machine, planer or drilling press, while being operated upon. The employment of an air blast for the removal of such fine metal is objectionable for the reason that if the blast is made strong enough to remove the larger pieces of metal, the very fine particles will be scattered widely throughout the shop and be inhaled by the workmen. The invention described herein relates to means for lifting the particles both large and small from the grooves or holes removing them to a point clear of the machine where they can be discharged into a suitable trough or receptacle. The invention is hereinafter more fully described and claimed.

In the accompanying drawing forming a part of this specification, Figure 1, is a side elevation of a boring machine having my improvement applied thereto; Fig. 2 is a plan view of a portion of the article operated on and showing a modification of my improvement employed for removing the cuttings; Fig. 3 is a side elevation of the arrangement shown in Fig. 2.

It will be understood by those skilled in the art that although my improvement is shown in connection with a boring machine having a rotating table for carrying the article under a relatively stationary tool, it may be applied to other forms of metal cutting machines, such as planers, strippers, etc., and hence my improvement is not limited to use in connection with any particular construction of metal working machine.

When employing my improvement in connection with a boring machine, where the article is secured to the rotating table 1 of the machine, a magnet is so supported above the table as to be capable of being moved across a portion of the article 2 secured to the bed 1 and in such close proximity to the article that cuttings and pieces of metal lying in a recess or cavity formed in such article, will be lifted from the cavity or groove and attach themselves to the pole of the magnet. The magnet should be capable of movement to a position where it will attract the cuttings etc. to a point clear of the rotating bed where the metal particles can be separated from the magnet and preferably discharged into a trough 3, which will conduct them to a suitable receptacle. In the construction shown in Fig. 1, an arm 4 is rotatably mounted on a rod 5, carried by bearings 6 secured to the cross rail 7 of the boring machine. This arm is adapted also to move up and down along the rod 5 and to be secured in any position, horizontal or vertical, by a set screw 8. The outer end of the arm is provided with a sleeve 9 through which passes a shaft 10 adapted to be rotated in any suitable manner, as for example, by a motor 11, having a worm on its shaft engaging a worm wheel 12 on the upper end of the shaft 10. On the lower end of the shaft 10 is secured a spider 13, provided with a series of radial arms to the outer ends of which are attached electro-magnets 14. These electro-magnets are included in circuits formed in part by contact plates 15 on the hub of the spider and in part by contact springs 16 on the lower end of the sleeve 9, so that when the spider is rotated the circuit through the magnet passing across and over the piece being operated upon, will be closed and the magnet excited so as to attract the metal particles lying in the groove in such piece. The contact plates 15 and springs 16, are so constructed that the magnet will be excited, so that particles will continue to adhere to the pole of the magnet until the latter comes above a trough 3, where the circuit of the magnet is broken permitting the particles to drop into the trough.

It will be readily understood by those skilled in the art that any suitable form of commutator may be employed for making and breaking the circuit through the several magnets.

In lieu of employing a plurality of magnets, as shown in Fig. 1, a single magnet 17, may be arranged above the path of movement of the article from which the cuttings are to be removed, as shown in Figs. 2 and 3, and a series of sectors 18, formed of magnetic material as iron, arranged in a wheel 19 so mounted in suitable relation to the magnet and the article being cut, that these sectors will pass between the magnet and the article. The several parts are so constructed that the upper sides of the sectors will be in such proximity to the lower pole of the magnet as to be similarly magnetized. As these sectors pass under the magnets and in contact with or in proximity thereto, they will become magnetized, and the particles will be attracted thereto and remain adhering on the lower side of the block until after the sectors pass from under and out of contact with the magnet.

I claim herein as my invention:

1. In a metal working machine the combination of a work supporting table and a magnet supported in suitable relation to the table, one of said elements being movable relative to the table whereby small particles detached from the article supported by the table may be attracted to the magnet.

2. In a metal working machine, the combination of a work supporting table, a magnet, means for moving the magnet to and from operative relation to an article supported on the table.

3. In a metal working machine, the combination of a work supporting table, an electro-magnet, means for moving the magnet into and from proximity to an article supported by the table, a make and break mechanism adapted to complete the circuit through the magnet when in proximity to the article and to break such circuit when shifted away from the article.

4. In a metal working machine, the combination of a work supporting table, a magnetic element movable relative to the table said element being adapted to be energized when in proximity to an article on the table and to be energized when moved away from said article.

5. In a metal working machine, the combination of a work supporting table, a series of electro-magnets, means for moving the magnets successively into and out of operative relation to an article carried by the table, and means for making and breaking the circuits through the several magnets successively.

In testimony whereof, I have hereunto set my hand.

FRANK J. CURTIS.

Witness:
ALICE A. TRILL.

Copies of this patent may be obtained for five cents each, by addressing the "Commissioner of Patents, Washington, D. C."

It is hereby certified that the residence of the assignee in Letters Patent No. 1,248,276, granted November 27, 1917, upon the application of Frank J. Curtis, of Ben Avon, Pennsylvania, for an improvement in "Machine-Tools," was erroneously given as "Braddock, New Jersey," whereas said residence should have been given as *Braddock, Pennsylvania*, as shown by the records of assignments in this office; and that the said Letters Patent should be read with this correction therein that the same may conform to the record of the case in the Patent Office.

Signed and sealed this 15th day of January, A. D., 1918.

[SEAL.]

R. F. WHITEHEAD.

*Acting Commissioner of Patents.*

Cl. 77—5.